United States Patent [19]

Flannery et al.

[11] 3,920,462

[45] Nov. 18, 1975

[54] THERMALLY OPACIFIABLE GLASSES

[75] Inventors: James E. Flannery; Dale R. Wexell, both of Corning, N.Y.

[73] Assignee: Corning Glass Works, Corning, N.Y.

[22] Filed: Feb. 4, 1974

[21] Appl. No.: 439,077

[52] U.S. Cl. .................................. 106/52; 106/39.6
[51] Int. Cl.$^2$ ....................... C03C 3/04; C03C 3/10
[58] Field of Search ........................................ 106/52

[56] References Cited
UNITED STATES PATENTS

| | | | |
|---|---|---|---|
| 2,224,469 | 12/1940 | Blau | 106/52 |
| 2,921,860 | 1/1960 | Stookey | 106/52 |
| 3,607,320 | 9/1971 | Sakka | 106/52 X |
| 3,681,098 | 8/1972 | Dumbaugh, Jr. et al. | 106/52 |

*Primary Examiner*—Allen B. Curtis
*Assistant Examiner*—Thomas A. Waltz
*Attorney, Agent, or Firm*—Clinton S. Janes, Jr.; Clarence R. Patty, Jr.

[57] ABSTRACT

This invention relates to thermally opacifiable glasses which exhibit uniformly dense opacity, that do not require the presence of lead or lithium, and contain as the primary opacifying phase a crystal selected from the group consisting of sodium molybdate, sodium tungstate, barium molybdate, barium tungstate, and mixtures thereof. The glasses consist essentially, by weight on the oxide basis, of about 64–80% $SiO_2$, 2–12% $Al_2O_3$, 9–16% $R_2O$, wherein $R_2O$ consists of 9–15% $Na_2O$ and 0–5% $K_2O$, 1.2–4% $RO_3$, wherein $RO_3$ consists of 1.2–4% $MoO_3$, or 1.6–4% $WO_3$, or mixtures thereof in amounts equivalent to at least 1.2% $MoO_3$, 0.5–3% F, and, preferably, up to 4% BaO.

6 Claims, No Drawings

THERMALLY OPACIFIABLE GLASSES

BACKGROUND OF THE INVENTION

The invention relates to a system of reheat opal glasses, that is, glasses in which opacity is developed by a heat treatment subsequent to article formation.

The term "opal glass", as used herein, generally denotes a glass containing a separated phase dispersed in the glassy matrix, which phase has an index of refraction differing from that of the transparent glass so as to render it essentially light diffusing or opaque. This separated phase may be either crystalline or amorphous. The degree of opacity may vary from a faint translucency to a dense opacity such as found in alabaster. Among the opacifying agents commonly used heretofore are fluorides, sulfates, chlorides and phosphates.

Opal glasses may be categorized as spontaneous opals or reheat opals, depending on the rate of opal development. In a spontaneous opal glass, the light-diffusing phase develops as a glass article is formed from a glass melt and cooled. A reheat opal glass is one which develops opacity relatively slowly. Accordingly, a glass article formed from a reheat opal glass in the usual manner will be clear, or only faintly opacified, as formed and cooled. Such an article is then subjected to a further thermal treatment, that is reheated, to separate the opal phase in the glass.

It is well recognized in the glass industry that serious air pollution problems may be encountered when either lead oxide or a fluorine compound is included in a glass composition. Furthermore, as noted by H. H. Blau in U.S. Pat. No. 2,224,469 granted Dec. 10, 1940, the volatilization of fluorine is aggravated by the presence of either water or a boron compound in the glass batch. Accordingly, the patentee proposed alkali metal fluoride opal glasses which included alumina in their compositions, which excluded boron and second group metal oxides, and which were melted from anhydrous batch materials. In spite of these precautions, the patent discloses that a glass calculated from the batch to contain 6.9% fluorine (F), actually showed only 3.7% by chemical analysis.

U.S. Pat. No. 2,921,860 granted Jan. 19, 1960 in the name of S. D. Stookey, discloses spontaneous opal glasses containing both alumina and lithia in their compositions and alkali metal fluoride as the opacifying crystal phase. The lithia is included to accelerate the rate of opacification, and enables the production of spontaneous opal glass articles on automatic machinery. A content of at least 5% fluorine is required, and the patent discloses that a glass calculated from the bath to contain 6.9% F, actually showed 5.2% by analysis when melted in a large commercial tank.

The recent strong emphasis on air pollution control has made it increasingly desirable to avoid or minimize such potential air pollutants as fluorine compounds, lead oxide, and boron compounds in glass compositions. Further, a shortage of suitable lithia-containing raw materials has made it desirable to avoid the use of this oxide in glass compositions whenever possible. Accordingly, it is a primary purpose of the present invention to produce a reheat opal glass which does not require the presence of either lead oxide or lithia, and wherein the fluorine content is reduced to a relatively low level.

Several recently issued United States patents, for example, U.S. Pat. No. 3,681,098 granted Aug. 1, 1972 to Dumbaugh et al. and U.S. Pat. No. 3,728,139 granted Apr. 17, 1973 to Carrier et al., disclose that the oxides of molybdenum, tungsten, and arsenic create a unique effect in phase-separated, borosilicate type opal glasses. The opal phase in these glasses is in the form of droplets, and the effect of these oxides is to modify the geometrical nature of these opacifying droplets. The patents disclose that the modification results from a change in interfacial tensions between the two separated glass phases. This results in a denser opacity, but the chemical nature of the opacifying phase does not undergo any apparent change.

RELATED APPLICATION

A companion application, Ser. No. 439,078, filed concurrently herewith by us and entitled "Spontaneous Opal Glasses", discloses base glasses similar to those of the present invention but free of boron and fluorine and containing an appreciable amount of lithia.

SUMMARY OF THE INVENTION

The present invention is based on our discovery that a crystal phase consisting of a molybdate and/or tungstate of sodium and/or barium can separate from certain glasses to produce a high degree of opacity in the glass. It is further based on our discovery that this crystal development enables us to produce a fluoride-containing, thermally opacifiable opal glass from which the oxides of lead and lithium may be omitted completely and the fluorine content maintained below 3%.

The invention contemplates an essentially lead-free, fluoride-containing, thermally opacifiable glass consisting essentially, in weight percent on the oxide basis, of about 64–80% $SiO_2$, 2–12% $Al_2O_3$, 9–16% $R_2O$, wherein $R_2O$ consists of 9–15% $Na_2O$ and 0–5% $K_2O$, 1.2–4% $RO_3$, wherein $RO_3$ consists of 1.2–4% $MoO_3$ or 1.6–4% $WO_3$ or mixtures thereof in amounts equivalent to at least 1.2% $MoO_3$, 0.5–3% F, and 0–4% BaO, the predominant opacifying phase crystals being selected from the group consisting of sodium molybdate, sodium tungstate, barium molybdate, barium tungstate, and mixtures thereof. The preferred practice of the invention contemplates including an amount of BaO effective to produce such crystals, but not exceeding about 4%.

A particular feature of the invention is the production of a relatively inexpensive, thermally opacifiable opal glass from readily available raw materials. Another feature is the production of such glass while minimizing air pollution from volatile batch materials. A further feature is the production of a glass having a denser opacity than currently available fluoride opal glasses.

The opacifying phase in the present glasses may be composed entirely of molybdate and/or tungstate crystals. However, since a small amount of fluorine is present, the opacifying phase will frequently also contain fluorides, the relative amounts of different crystals depending on relative solubilities in the particular base glass. At least 1.2% $MoO_3$ or 1.6% $WO_3$ or an equivalent mixture is required to produce the novel opacifying phase. Since $MoO_3$ is about 25% more effective than $WO_3$ in producing crystals, a lesser amount thereof is required to cause the development of crystals. Where less than 1.2% $MoO_3$ is present, an amount of $WO_3$ must be included to yield a mixture of the two components equivalent to the presence of at least 1.2% $MoO_3$. For example, where $MoO_3$ is utilized in an amount of 1.0%, at least about 0.25% $WO_3$ is required to insure crystal growth. Preferably, the glass contains at least 2% of these oxides, but not over a combined total of 4% because of difficulty in dissolving such larger amounts during melting of the glass.

The alkali metal oxides, $Na_2O$ and $K_2O$, perform their usual fluxing action in glass melting and provide control of glass working properties and coefficient of thermal expansion. It is customary to adjust physical properties, in particular thermal expansion and temperature-viscosity relationship, by utilizing mixtures of these oxides in varying proportions. For example, the substitution of $K_2O$ for $Na_2O$ generally increases expansion and hardens the glass, that is raises the standard temperature-viscosity indicia (softening, strain, and annealing points). Where the glasses are to be thermally strengthened (tempered), the coefficient of expansion should be at least $45 \times 10^{-7}/°C$. With increasing alkali metal oxide content, expansion may increase unduly, the glasses lose chemical durability, and may become too soft for satisfactory firing of decorative enamels. Accordingly, the total content of $Na_2O + K_2O$ should not exceed about 16%.

A content of at least about 9% $Na_2O$ is required in the present glasses for melting purposes. Soda also provides the primary opacifying phase, sodium molybdate or tungstate, in the absence of barium oxide. When BaO is present in the glass composition, there is a tendency for barium molybdate or tungstate to separate as part, or all, of the opacifying phase as a result of its more limited solubility. Glass expansion tends to increase rapidly with increasing BaO content, however, and the amount present should not exceed about 4%. Other divalent oxides such as MgO, CaO, SrO, CdO, and ZnO may be present in minor amounts to modify physical properties, but normally do not contribute to opacity.

Lithia ($Li_2O$) tends to act as a nucleating agent to render crystal formation spontaneous. Accordingly, we prefer to avoid this oxide in the present glasses. However, up to 3% may be tolerated in instances where opal formation otherwise occurs very slowly on reheating.

The presence of alumina facilitates opal development as well as improves chemical durability. With less than about 2% $Al_2O_3$, chemical durability tends to be very poor. Amounts greater than about 12% tend to make melting and forming difficult, and we prefer to limit $Al_2O_3$ to not over about 10% for this reason.

In addition, minor amounts of other compatible constituents may be included for such recognized secondary purposes as melting aids, coloring purposes, fining agents, and for improvement of surface durability.

Glasses within the present invention may generally be melted and formed according to conventional and well-known glass melting and working techniques. Thus, they may be melted in either gas fired or electrically heated melting units at maximum temperatures in the range of about 1400°–1550°C. The particular melting schedule for any given glass may be determined from the glass properties and the nature of the melting unit in known manner.

Batch ingredients of a conventional nature are chosen. For example, a typical bath may contain sand, calcined alumina, molybdic and/or tungstic oxide, nitre, sodium silicofluoride, potash, barium carbonate, and arsenic oxide as a fining agent. Other known and equivalent raw materials may be substituted as desired.

The glasses may be molded or worked in any conventional manner. Hence, they may be rolled, drawn, pressed or blown depending on the nature of the product desired. The article thus produced is normally clear and transparent, although a faint haze or translucence may appear if solubility of the opal phase is low or if lithia is present. The opal phase is developed, that is precipitated within the glass, by a reheat step. In this step, the article is preferably nucleated within a temperature range of 450°–600°C. for a period of about 10 to 90 minutes. After nucleation, the temperature may be brought within the range of 560°–700°C. for a time ranging up to about two hours to develop a dense uniform opal which is white, except as colorants are included to produce colored products such as tableware.

DESCRIPTION OF SPECIFIC EMBODIMENTS

The invention is further described with reference to exemplary glass compositions set forth in Table I in percent by weight on an oxide basis as calculated from the bath. In addition, glass physical properties, including strain point (St.P.), annealing point (A.P.), and softening point (S.P.), all reported in °C., as well as average thermal expansion coefficient $\times 10^{-7}$ between 0°C. and 300°C. (Exp.) and density (D) in grams/cc., are shown. Also, the major and minor crystal phases, as determined through X-ray diffraction analyses, are recorded.

Table I

|  | 1 | 2 | 3 | 4 | 5 | 6 |
|---|---|---|---|---|---|---|
| $SiO_2$ | 73.5 | 77.4 | 74.9 | 73.1 | 72.3 | 66.4 |
| $Al_2O_3$ | 4.6 | 7.0 | 4.5 | 6.9 | 7.6 | 10.8 |
| $Na_2O$ | 13.2 | 9.6 | 13.5 | 10.7 | 10.3 | 13.4 |
| $K_2O$ | 1.3 | 1.4 | 1.3 | 1.5 | 1.3 | 1.3 |
| F | 2.5 | 1.9 | 1.6 | 1.8 | 2.4 | 2.5 |
| $MoO_3$ | 1.8 | — | 1.9 | 2.9 | 1.8 | — |
| $WO_3$ | — | 2.7 | — | — | — | 2.5 |
| $Li_2O$ | — | — | 2.3 | 0.9 | 1.3 | — |
| BaO | 3.1 | — | — | 1.9 | 3.0 | 3.1 |
| $As_2O_3$ | — | — | — | 0.4 | — | — |
| Crystal Phase |  |  |  |  |  |  |
| Major | $BaMoO_4$ | $Na_2WO_4$ | $Na_2MoO_4$ | $BaMoO_4$ | $BaMoO_4$ | $BaWO_4$ |
| Minor | NaF | NaF | NaF | LiF | LiF | NaF |
| D(g/cc.) | 2.4 | 2.4 | 2.3 | 2.4 | 2.4 | 2.5 |
| S.P.(°C.) | 705 | 753 | 706 | 755 | 742 | 752 |
| A.P.(°C.) | 540 | 548 | 525 | 549 | 530 | 538 |
| St.P. (°C.) | 499 | 507 | 488 | 515 | 478 | 471 |
| Exp.($\times 10^{-7}$/°C.) | 76.1 | 68.2 | 66.7 | 63.9 | 67.3 | 79.9 |

We claim:

1. An essentially lead-free, $B_2O_3$-free thermally opacified glass, wherein crystals selected from the group consisting of sodium molybdate, sodium tungstate, barium molybdate, barium tungstate, and mixtures thereof constitute the predominant opacifying phase, said glass consisting essentially, by weight on the oxide basis, of about 64–80% $SiO_2$, 2–12% $Al_2O_3$, 9–16% $R_2O$, wherein $R_2O$ consists of 9–15% $Na_2O$ and 0–5% $K_2O$, 1.2–4% $RO_3$, wherein $RO_3$ consists of 1.2–4% $MoO_3$ or 1.6–4% $WO_3$ or mixtures thereof in amounts at least equivalent to 1.2% $MoO_3$, 0.5–3% F, and 0–4% BaO.

2. An essentially lead-free, $B_2O_3$-free, thermally opacified glass according to claim 1 containing an amount of BaO effective to produce crystals of barium molybdate and/or barium tungstate.

3. An essentially lead-free, $B_2O_3$-free, thermally opacified glass according to claim 1 that is also essentially free of BaO and that contains sodium molybdate and/or sodium tungstate as the predominant opacifying crystal phase.

4. An essentially lead-free, $B_2O_3$-free thermally opacified glass according to claim 1 wherein $RO_3$ consists of 1.2–4% $MoO_3$ and the predominant crystal phase is sodium molybdate or barium molybdate.

5. An essentially lead-free, $B_2O_3$-free, thermally opacified glass according to claim 1 wherein $RO_3$ consists of 1.6–4% $WO_3$ and the predominant crystal phase is sodium tungstate or barium tungstate.

6. An essentially lead-free, $B_2O_3$-free, thermally opacified glass according to claim 1 wherein the $Al_2O_3$ content does not exceed 10%.

\* \* \* \* \*

UNITED STATES PATENT OFFICE
CERTIFICATE OF CORRECTION

PATENT NO. : 3,920,462
DATED : November 18, 1975
INVENTOR(S) : James E. Flannery and Dale R. Wexell It is certified that error appears in the above-identified patent and that said Letters Patent are hereby corrected as shown below:

Column 2, line 41, "barius", both occurrences, should be -- barium --.

Column 4, line 15, "bath" should be -- batch --.

Column 4, line 40, "bath" should be -- batch --.

Signed and Sealed this fourth Day of May 1976

[SEAL]

Attest:

RUTH C. MASON
Attesting Officer

C. MARSHALL DANN
Commissioner of Patents and Trademarks